Figure 1:
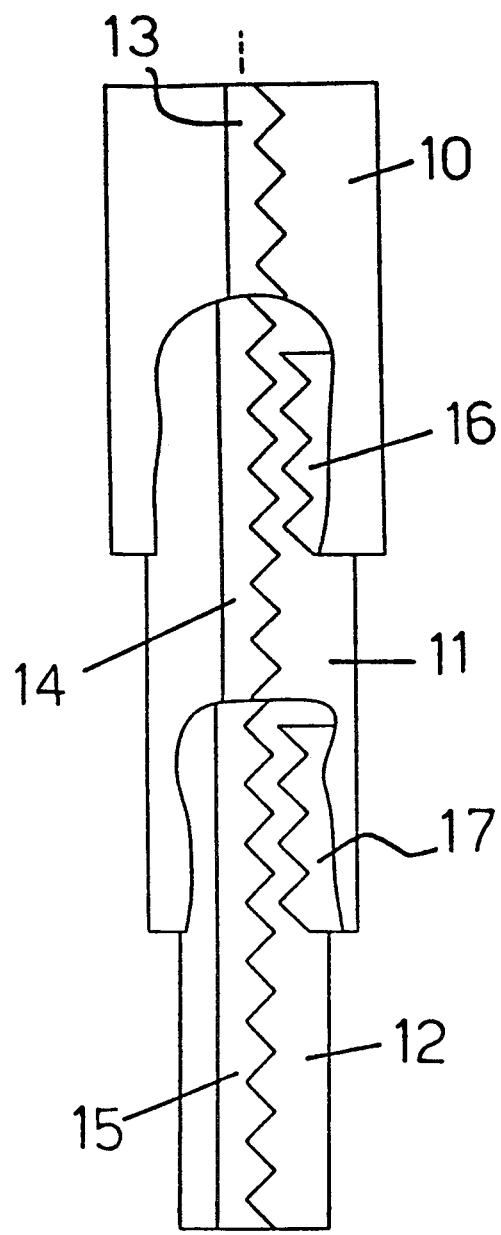

United States Patent [19]

Trevisnani

[11] Patent Number: 5,184,688
[45] Date of Patent: Feb. 9, 1993

[54] TELESCOPIC BAR OF DRILL RIG

[75] Inventor: Gian Luigi Trevisnani, Cesna, Italy

[73] Assignee: International Foundations Constructions Ltd., Hong Kong, Hong Kong

[21] Appl. No.: 678,104

[22] Filed: Apr. 1, 1991

[51] Int. Cl.⁵ .............................................. F21B 4/00
[52] U.S. Cl. ................................................... 175/321
[58] Field of Search ................................. 175/320–322

[56] References Cited

U.S. PATENT DOCUMENTS 3,987,856 10/1976 Carl et al.
4,463,815 8/1984 Jurgens et al. ............... 175/321 X
4,494,615 1/1985 Jones ........................... 175/321 X

FOREIGN PATENT DOCUMENTS 0335059 10/1989 European Pat. Off.
2195379 4/1988 United Kingdom.

Primary Examiner—Thuy M. Bui
Attorney, Agent, or Firm—Merchant, Gould, Smith, Edell, Welter & Schmidt

[57] ABSTRACT

A telesciopic bar of drill rig for drilling in general, where the telescopic sections (10, 11, 12) consist of concentric, substantially cylindrical pipes, each of them equipped with longitudinal internal (16,17) and external (13,14) toothed ribs arranged in such a way that the external rib of each pipe and the internal one of the external pipe are engaged when the bar is being rotated to lock the telescopic sections in position, and released when the bar is being rotated in the opposite direction to lift and withdraw the bar sections.

2 Claims, 1 Drawing Sheet

TELESCOPIC BAR OF DRILL RIG

Drilling technique for large diameter bored piles by means of a drill rig is well known. This machine consists of a bar divided into concentric, tubular sections with a telescopic movement while drilling. It is also known that such bars in order to transmit the tool a rotary motion, consist of tubular sections with one or more longitudinal external and internal projections to form a "sliding splined coupling".

It is also know that it is possible to transmit thrust forces to the drilling tool, particularly in hard soil, where drilling proves to be difficult. Such forces, applied to the bar end in different ways cannot be very strong since, in traditional telescopic bars, they make one section slide vertically onto the next, the only limit being friction. Purpose of the invention is to improve coupling elements, in order to increase the value of the thrust force which can be applied without preventing vertical sliding when bars are withdrawn.

For this and for other purposes which will be better understood further on the invention intends to produce a telescopic bar of drill rig for drilling in general, characterized by the fact that the telescopic sections forming the bar are concentric, substantially cylindrical pipes, each of them equipped with inner fand outer longitudinal toothed ribs, arranged in such a way that the external rib of each pipe is engaged with the internal rib of the external pipe, when the bar is being rotated in order to lock the telescopic sections, and released when the bar is being rotated in the opposite direction to lift and withdraw the bar sections.

Figure 2:
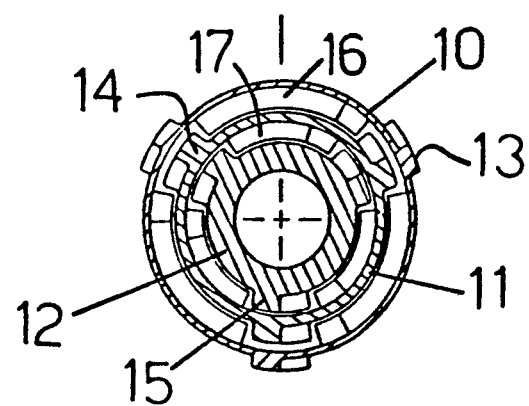

The subject of the invention is now described with reference to the enclosed drawings, whereas FIG. 1 illustrates a part of the telescopic sections of the bar according to the invention and FIG. 2 shows the transversal section of the bar illustrated by FIG. 1.

The aim of the invention is reached by means of toothed ribs fixed to the pipe sections.

As shown in the drawings, telescopic pipes 10, 11 and 12 are equipped with toothed ribs 13, 14, and 15, fixed to their external surface, while pipes 10 and 11 are also equipped with toothed ribs 16 and 17 fixed to their inner surfaces.

As shown in FIG. 2 ribs 13, 14 and 15 as well as ribs 16 and 17 are divided into groups of three at a distance of 120 degrees along the round pipes to which they are fixed. The configuration we have illustrated here seems to be the most effective, but it is understood that many other configurations and positions of ribs 13–17 would permit to reach the same goals, too. In the same way the teeth, herein described as triangular, can also have another shape, but they will still be considered as subject of this invention.

We would also like to point out that the enclosed drawings show only three concentrical pipes 10, 11 and 12, but a telescopic rig can be formed by as many pipes as required, even by many more than three.

As it is known, one or more motors applied to one or more pipes in the rig make them rotate and come out for the operation. These motors are not illustrated, since the average technician would consider them as obvious.

When thrust and torsional stresses are applied, the teeth of the outer ribs 13, 14, 15 of bar sections 10,11,12 adhere to analogous teeth, in the same shape and size on inner ribs 16,17 of another bar section, thus obtaining a sort of engagement, which is able to transmit great longitudinal forces.

If the sections of pipes 10, 11, 12 have to be withdrawn one within the other, pipes 10, 11, and 12 should simply be rotated slightly in the direction opposite to the drilling one, to release the teeth from their grip.

A remarkable advantage of this system in comparison with other possible mechanical locking systems is that engagement can be obtained in any position.

I claim:

1. Telescopic bar of drill ring for drilling in general, comprising telescopic sections forming the bar, each of the telescopic sections being concentric, substantially cylindrical pipes equipped with inner and outer longitudinal toothed ribs; the inner and outer longitudinal toothed ribs having a plurality of individual teeth with wholly triangular cross-sections in the longitudinal direction; the outer longitudinal toothed rib of each pipe being engaged with the inner longitudinal toothed rib of an external pipe to lock the telescopic sections when the bar is rotated in a first direction; the telescopic sections being released when the bar is rotated in a direction opposite the first direction, in order to lift and withdraw the bar.

2. Telescopic bar of claim 1, wherein each of the pipes includes three inner and outer longitudinal toothed ribs, the three longitudinal toothed ribs being spaced 120 degrees from one another.

* * * * *

UNITED STATES PATENT AND TRADEMARK OFFICE
CERTIFICATE OF CORRECTION

PATENT NO. : 5,184,688

DATED : February 9, 1993

INVENTOR(S) : Trevisani

It is certified that error appears in the above-identified patent and that said Letters Patent is hereby corrected as shown below:

On title page under "Inventor", delete "Trevisnani, Cesna" and insert --Trevisani, Cesena--.

On title page under "Assignee", delete "Hong Kong".

On title page under "Filed", insert --[30] Foreign Application Priority Data: 9 April 1990, United Kingdom, Application Number 9007994-8--.

Item [57]
In the abstract, line 1, delete "telesciopic" and insert --telescopic--.

In column 2, line 31, delete "ring" and insert --rig--.

Signed and Sealed this

Second Day of January, 1996

*Attest:*

BRUCE LEHMAN

*Attesting Officer*     Commissioner of Patents and Trademarks